United States Patent
Bivens et al.

(12)

(10) Patent No.: US 6,269,919 B1
(45) Date of Patent: Aug. 7, 2001

(54) PLASTIC STRAND DAMPER

(75) Inventors: Steven L. Bivens, Kankakee; Eric Parker, Chicago, both of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/328,134

(22) Filed: Jun. 8, 1999

Related U.S. Application Data

(63) Continuation-in-part of application No. 09/153,276, filed on Sep. 14, 1998, now Pat. No. 6,189,662.

(51) Int. Cl.$^7$ .................................................. F16F 9/48
(52) U.S. Cl. .......................................................... 188/288
(58) Field of Search .................................. 188/266, 288, 188/301, 322.15; 267/64.15, 64.11, 113, 118, 120, 124, 128; 16/44, 66, 84

(56) References Cited

U.S. PATENT DOCUMENTS

| | | | |
|---|---|---|---|
| 3,722,920 | * | 3/1973 | Reese ................................ 280/446 B |
| 5,333,845 | * | 8/1994 | Seiichi ................................. 267/711 |
| 5,884,734 | * | 3/1999 | Hiramoto ......................... 188/322.18 |

* cited by examiner

*Primary Examiner*—Christopher P. Schwartz
*Assistant Examiner*—C. T. Bartz
(74) *Attorney, Agent, or Firm*—Pitney, Hardin, Kipp & Szuch LLP

(57) ABSTRACT

The damper includes a cylindrical housing with a cylindrical passageway formed therewithin. A piston traverses the cylindrical passageway. A strand element is integrally molded with the piston on a first end and integrally molded with an attachment element on a second end. The portion of the cylindrical passageway through which the piston traverses when the damper is in its retracted position has a reduced diameter.

11 Claims, 3 Drawing Sheets

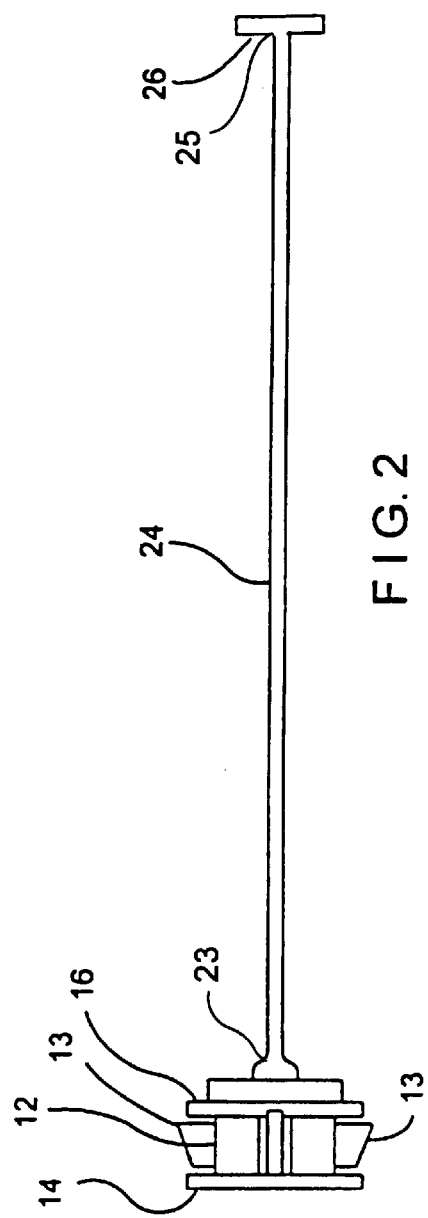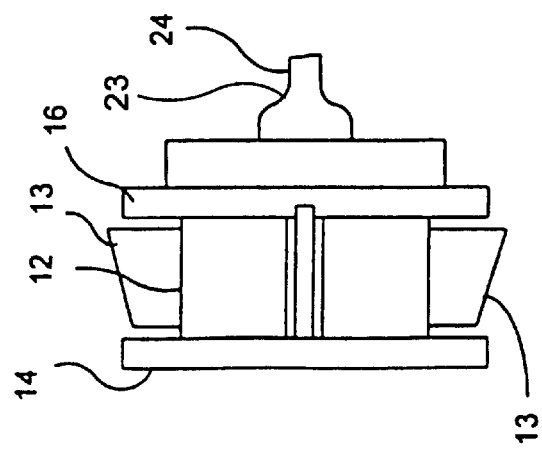

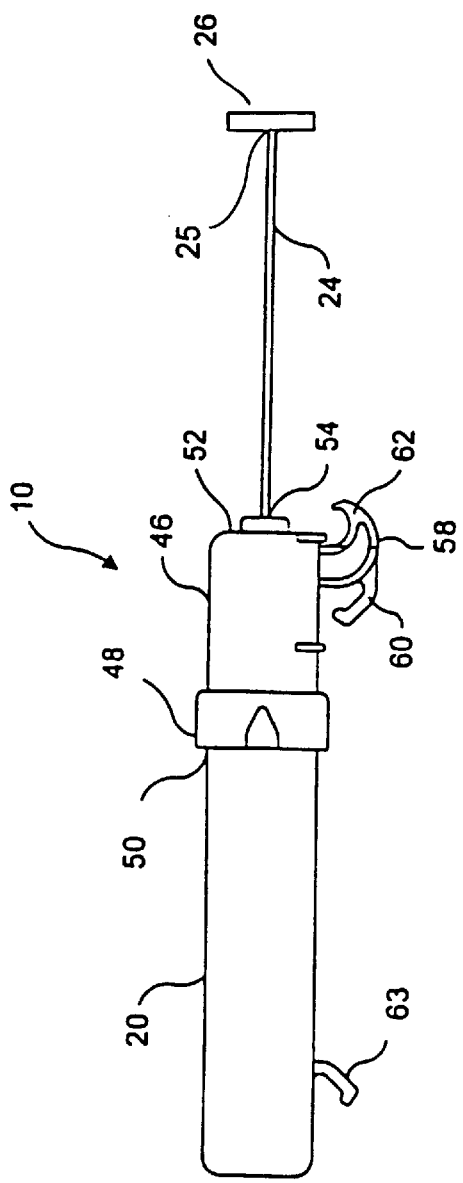
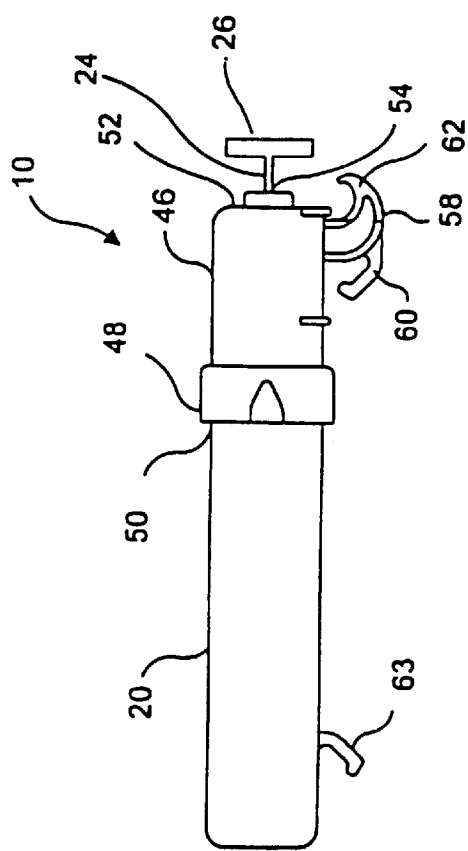
FIG. 4
FIG. 5

PLASTIC STRAND DAMPER

This application is a continuation-in-part of application Ser. No. 09/153,276 entitled "Adjustable Damper", filed on Sep. 14, 1998; now U.S. Pat. No. 6,189,662.

BACKGROUND OF INVENTION

1. Field of Invention

This invention pertains to a damper, such as is used with a glove box of an automobile. The damper includes an integral assembly of a piston, a plastic strand and a fastener and further includes a damper housing forming a cylinder with an area of decreased internal diameter.

2. Description of the Prior Art

The use of an air cylinder damper device in combination with a monofilament element biased by a spring for use with a storage cabinet, such as an automobile glove box, is well known as illustrated by U.S. Pat. No. 5,333,845, entitled "Damper Device" and issued to Seiichi on August 2, 1994. An air damper is likewise illustrated in U.S. Pat. No. 5,104,098 entitled "Cylinder Type Air Damper" and issued to Kaneko on Apr. 14, 1992.

However, the prior art designs have several disadvantages. Firstly, the prior art designs frequently require secondary fasteners to attach the damper to the panel. Secondly, the prior art designs have frequently utilized a monofilament element with loops formed at each end. Metal clasps are pinched onto the monofilament element at each end to form loops. One loop is attached to the piston and the other loop is attached to the glove box. In this design, the string must be cut to length and then the clasps are added. Moreover, string length will change or the loop will disengage completely if the string clasps become loose. Additionally, the prior art designs typically have an initial jump when the glove box is released.

OBJECTS AND SUMMARY OF THE INVENTION

It is therefore an object of this invention to provide a damper, such as for automobile glove box applications, which can be installed with minimal or no secondary fasteners.

It is therefore a further object of this invention to provide a damper, such as for automobile glove box applications, which has a reduced number of components.

It is therefore a still further object of this invention to provide a damper, such as for automobile glove box applications, wherein the length of the integral assembly including the piston, the strand and the fastener can be molded to a single length.

It is therefore a still further object of this invention to provide a damper, such as for automobile glove box applications, which provides a reliable engagement between the piston, the strand and the door, such as that of an automobile glove box.

It is therefore a still further object of this invention to provide a damper, such as for automobile glove box applications, which minimizes or eliminates the initial jump when the door, such as that of an automobile glove box, is initially opened.

These and other objects are attained by providing an air damper with a housing, a cap, a spring, and an integral assembly of a piston, a plastic strand and an attachment element. The integral assembly is typically molded from "nylon 6" material. The housing forms a cylinder through which the piston travels and further includes an integral fastener with opposed scythe-like hook structures to allow the housing to be "rocked-in" the panel without the use of separate secondary fasteners.

As the piston, strand and attachment element are molded as a single piece, this eliminates any need for a secondary monofilament element with loops and clasps which may fail. As the strand is molded to a fixed length, this fixes the distance from the piston to the attachment element. The attachment element further attaches to the glove box or an associated element.

The diameter of the cylinder formed within the damper housing is decreased near the closed end of the housing to increase friction between the piston discs and the housing when the air damper is in a closed or nearly closed position. This additional friction eliminates the initial jump otherwise frequently associated with air dampers.

BRIEF DESCRIPTION OF THE DRAWINGS

Further objects and advantages of the invention will become apparent from the following description and claims, and from the accompanying drawings, wherein:

FIG. 2 is a side plan view of the integral piston, strand and fastener element of the present invention.

FIG. 3 is side plan view of the piston of the present invention.

FIG. 4 is a side plan view of the damper of the present invention with the strand element extended.

FIG. 5 is a side plan view of the damper of the present invention with the strand element retracted.

DETAILED DESCRIPTION OF THE PREFERRED EMBODIMENT

Figure 1:
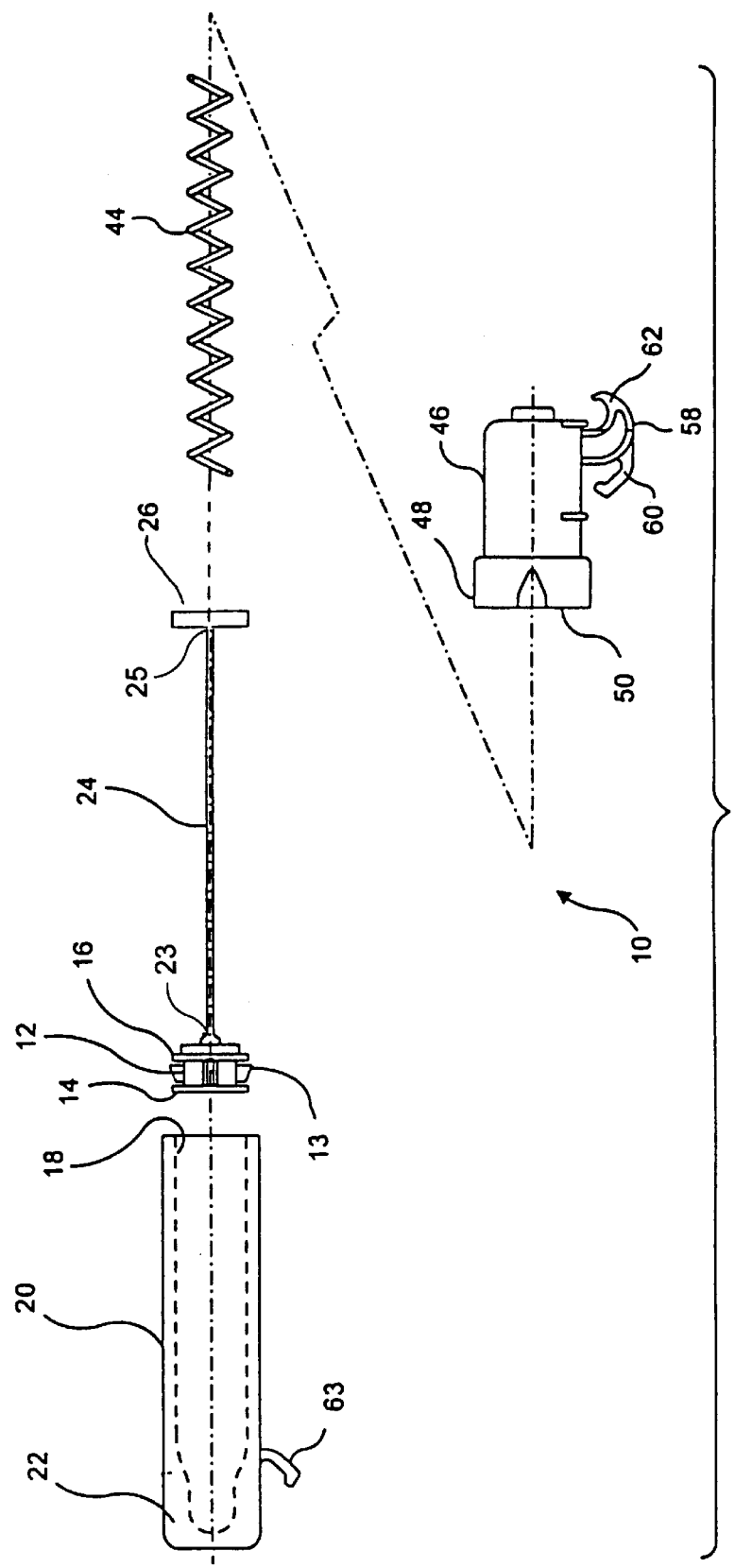
FIG. 1 is an exploded view, partially in phantom, of the damper of present invention.

Referring now to the drawings in detail wherein like numerals refer to like elements throughout the several views, one sees that FIG. 1 is an exploded view, partially in phantom, of the damper 10 of the present invention. Damper 10 includes cylindrical piston 12 with circular peripheral discs 14, 16 which engage cylinder passageway 18 of lower damper housing 20. Lip seal 13 extends from cylindrical piston 12. Piston 12 travels within cylinder passageway 18 as damper 10 is extended or retracted as shown in FIGS. 4 and 5, respectively. As shown in phantom in FIG. 1, cylinder passageway 18 of lower damper housing 20 includes a lower portion 22 of reduced diameter, this reduction of diameter being exaggerated in FIG. 1. The reduction of diameter of lower portion 22 provides a fit of increased tightness between piston 12 and cylinder passageway 18 when piston 12 is fully inserted into cylinder passageway 18 as in the retracted position shown in FIG. 5. This eliminates or minimizes the initial undamped movement or jump which is associated with air dampers.

As shown in FIGS. 2 and 3, strand element 24 has a first end 23 and a second end 25. First end 23 is integral with piston 12 while second end 25 is integral with disk-shaped attachment element 26. Attachment element 26 is illustrated as having a disk shape with a circular shape formed about a rotational axis formed colinearly with strand 24, but other shapes are contemplated, as determined by the application and the device (not shown) to which attachment element 26 is to be attached. Piston 12, strand element 24 and disk-shaped attachment element 26 are integrally molded, typically using "nylon 6" material, although those skilled in the art may recognize that other materials are suitable. However, the material chosen must be resistant to breakage and have minimal or zero elongation, particularly inelastic elongation, under the expected loads, which makes many plastic resins unsuitable.

As shown in FIG. 1, coil spring 44 is wrapped around strand element 24. A first end of coil spring 44 abuts piston 12 and a second end of coil spring 44 abuts upper damper housing 46 thereby urging piston 12 and strand element 24 toward a retracted position as illustrated in FIG. 5.

Upper damper housing 46 includes ring 48 on open end 50 thereof which snap fits onto lower damper housing 20. Upper damper housing 46 further includes closed end 52 with central aperture 54 through which strand element 24 reciprocatingly passes. Central aperture 54 is formed so that a longitudinal axis of damper 10 passes through central aperture 54. The cylindrical wall 56 of upper damper housing 46 further includes fastener 58 with opposed scythe-like hooks 60, 62. Lower damper housing 20 likewise includes fastener 63. The configuration of fastener 58 allows the damper 10 to be installed by a "rocking-in" motion with the subsequent alignment and engagement of fastener 63 without the necessity of secondary fasteners.

To use damper 10, the installer typically chooses an integral assembly of the piston 12, strand 24 and attachment element 26 with the piston 12 being suitable for the damper housing 20, the strand 24 of an appropriate length and the attachment element 26 being of the appropriate shape and characteristics for the specific application. This integral assembly, coil spring 44 and upper damper housing 46 are assembled with respect to damper housing 20. The installer then attaches fastener 58 to the appropriate door or panel (not shown) by a "rocking-in" motion and similarly attaches attachment element 26 to the appropriate door, panel or associated element (not shown). The choice of the dimensions of the particular elements and the adjustment thereof should provide for piston 12 to be urged into lower portion 22 of reduced diameter of cylinder passageway 18 when the associated door (not shown) is closed, and to allow piston 12 to traverse cylinder passageway 18 during the opening of the associated door. The sequence of steps can be varied according to the application and the preferences of the user.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A damper including:
    a housing with a cylindrical passageway formed therewithin, further including an aperture in said housing leading to said cylindrical passageway;
    a piston traversing said cylindrical passageway; and
    a strand element including a first end and a second end, said first end integrally formed with said piston and said second end integrally formed with an attachment element, said strand element reciprocatingly passing through said aperture.

2. The damper of claim 1 wherein said strand element, said piston and said attachment element are integrally molded of a plastic.

3. The damper of claim 2 wherein said plastic is a nylon 6 plastic.

4. The damper of claim 3 further including a coil spring through which said strand element passes.

5. The damper of claim 4 wherein said coil spring includes a first end and a second end, said first end abutting said piston and said second end abutting an end of said cylindrical passageway.

6. The damper of claim 5 wherein said end of said cylindrical passageway abutted by said second end of said coil spring is proximate to said aperture.

7. A damper including:
    a housing with a cylindrical passageway formed therewithin, further including an aperture in said housing leading to said cylindrical passageway;
    a piston traversing said cylindrical passageway; and
    a strand element including a first end and a second end, said first end integrally formed with said piston and said second end integrally formed with an attachment element, said strand element reciprocatingly passing through said aperture;
    wherein said piston traverses a first portion of said cylindrical passageway when said strand element is in a relatively retracted position and said piston traverses a second portion of said cylindrical passageway when said strand element is in a relatively extended position, and wherein a diameter of said first portion of said cylindrical passageway is reduced from a diameter of said second portion of said cylindrical passageway.

8. The damper of claim 7 wherein said reduced diameter of said first portion of said cylindrical passageway frictionally engages said piston to minimize any initial jump of the damper.

9. The damper of claim 8 wherein a longitudinal axis of said housing passes through said aperture and wherein said aperture is formed proximate to said second portion of said cylindrical passageway.

10. The damper of claim 9 wherein said housing is formed by a first part and a second part, said first part joining said second part along a circumferential section of said housing.

11. The damper of claim 10 wherein said first part of said housing snap fits to said second part of said housing.

* * * * *